(12) United States Patent
Shimizu et al.

(10) Patent No.: US 11,993,154 B2
(45) Date of Patent: May 28, 2024

(54) POWER SUPPLY DEVICE, AUTOMATIC STEERING VEHICLE, AND POWER SUPPLY METHOD

(71) Applicant: MITSUBISHI HEAVY INDUSTRIES, LTD., Tokyo (JP)

(72) Inventors: Kazutaka Shimizu, Yokohama (JP); Keisuke Kimura, Yokohama (JP); Eigo Hayashi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 388 days.

(21) Appl. No.: 17/434,585

(22) PCT Filed: Aug. 15, 2019

(86) PCT No.: PCT/JP2019/032026
§ 371 (c)(1),
(2) Date: Aug. 27, 2021

(87) PCT Pub. No.: WO2020/188848
PCT Pub. Date: Sep. 24, 2020

(65) Prior Publication Data
US 2022/0134885 A1 May 5, 2022

(30) Foreign Application Priority Data

Mar. 20, 2019 (JP) ................. 2019-053506

(51) Int. Cl.
*B60L 1/00* (2006.01)
*B60L 58/20* (2019.01)
(Continued)

(52) U.S. Cl.
CPC ............... *B60L 1/003* (2013.01); *B60L 58/20* (2019.02); *B60T 7/12* (2013.01); *B62D 5/04* (2013.01); *B61B 13/127* (2013.01)

(58) Field of Classification Search
CPC ........ B60L 1/003; B60L 58/20; B60L 3/0046; B60L 3/0061; B60L 3/0076;
(Continued)

(56) References Cited

U.S. PATENT DOCUMENTS 3,796,165 A * 3/1974 Goode .................. B62D 1/265
180/401
4,089,272 A * 5/1978 Schmitz ................. B61B 13/00
104/246
(Continued)

FOREIGN PATENT DOCUMENTS

JP S4960416 U 5/1974
JP H06191418 A 7/1994
(Continued)

OTHER PUBLICATIONS

International Search Report and Written Opinion of International Application No. PCT/JP2019/032026 dated Nov. 19, 2019; 16pp.

*Primary Examiner* — Mussa A Shaawat
(74) *Attorney, Agent, or Firm* — HAUPTMAN HAM, LLP

(57) ABSTRACT

This power supply device is provided with: a primary power supply system for supplying power to a motor for rotary-driving a running wheel; a voltage converter unit for converting voltage by being supplied with a part of the power from the primary power supply system; a secondary power supply system for supplying electric power converted by the voltage converter unit to a steering device; and a primary backup power supply for supplying power to the voltage converter unit. The primary backup power supply makes it possible to supply the power to the voltage converter unit when the voltage of the power detected by a VD of the primary power supply system becomes smaller than a predetermined value.

13 Claims, 4 Drawing Sheets

(51) Int. Cl.
  *B60T 7/12* (2006.01)
  *B62D 5/04* (2006.01)
  *B61B 13/12* (2006.01)

(58) Field of Classification Search
  CPC . B60L 3/0092; B60L 3/04; B60T 7/12; B60T 2270/60; B60T 17/18; B62D 5/04; B62D 1/28; B62D 5/0481; B62D 5/0484
  See application file for complete search history.

(56) References Cited

U.S. PATENT DOCUMENTS

| | | | | |
|---|---|---|---|---|
| 4,105,086 | A * | 8/1978 | Ishii | B62D 7/1545 |
| | | | | 180/401 |
| 4,265,180 | A * | 5/1981 | Uozumi | B61B 13/00 |
| | | | | 104/247 |
| 5,764,015 | A * | 6/1998 | Shimizu | B62D 15/0285 |
| | | | | 318/587 |
| 6,477,963 | B1 * | 11/2002 | Weule | B62D 1/265 |
| | | | | 104/243 |
| 2012/0306263 | A1 | 12/2012 | Tashiro et al. | |
| 2013/0001006 | A1 * | 1/2013 | Gibson | B62D 5/0463 |
| | | | | 180/446 |
| 2014/0265560 | A1 * | 9/2014 | Leehey | B60L 58/13 |
| | | | | 307/10.1 |
| 2015/0314796 | A1 * | 11/2015 | Maeyama | B61B 13/00 |
| | | | | 701/19 |
| 2015/0353104 | A1 * | 12/2015 | Maeyama | B61F 9/00 |
| | | | | 701/19 |
| 2016/0264156 | A1 * | 9/2016 | Yanobu | B61B 13/04 |
| 2017/0129342 | A1 * | 5/2017 | Tajima | B60G 17/0162 |
| 2020/0079366 | A1 * | 3/2020 | Higashitani | B60W 40/08 |

FOREIGN PATENT DOCUMENTS

| | | |
|---|---|---|
| JP | 2000050408 A | 2/2000 |
| JP | 2009090814 A | 4/2009 |
| JP | 2011011653 A | 1/2011 |
| JP | 2011019326 A | 1/2011 |
| JP | 2011255757 A | 12/2011 |
| JP | 2012249462 A | 12/2012 |
| JP | 2014147197 A | 8/2014 |

* cited by examiner

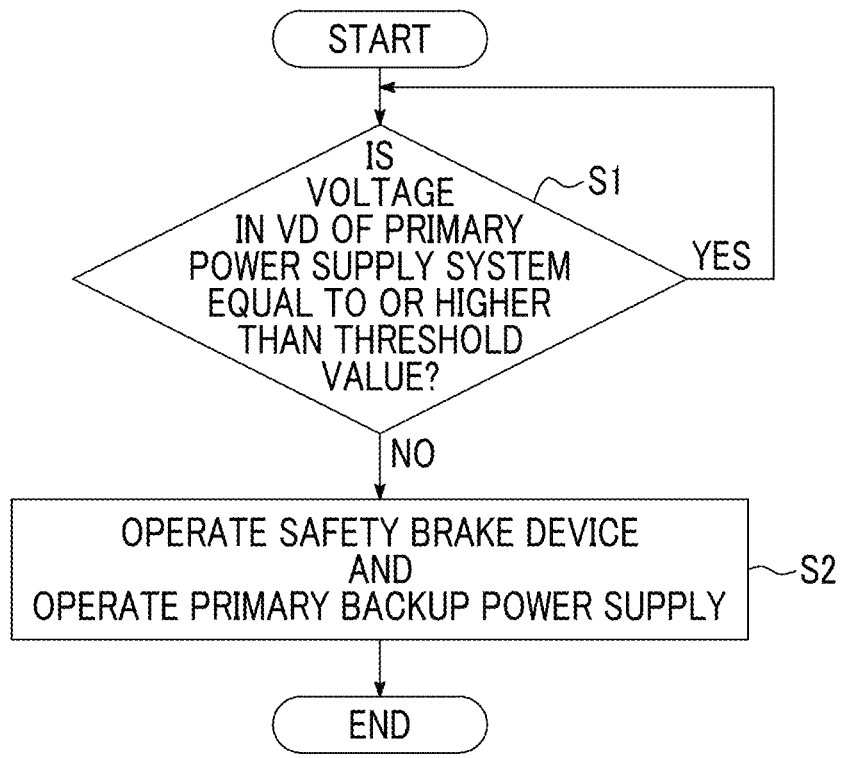
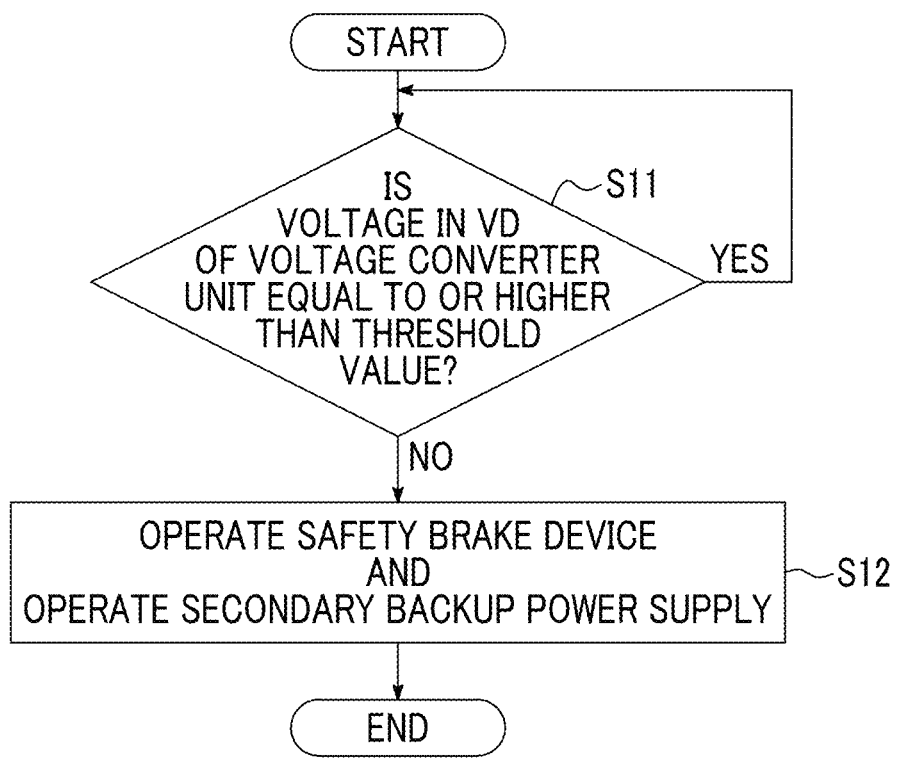

POWER SUPPLY DEVICE, AUTOMATIC STEERING VEHICLE, AND POWER SUPPLY METHOD

RELATED APPLICATIONS

The present application is a National Phase of International Application Number PCT/JP2019/032026 filed Aug. 15, 2019 and claims priority to Japanese Application Number 2019-053506, filed Mar. 20, 2019.

TECHNICAL FIELD

The present invention relates to a power supply device, an automatic steering' vehicle including a power supply device, and a power supply met hod. to the automatic steering vehicle.

Priority is claimed on Japanese Patent Application No. 2019-053506 filed on Mar. 20, 2019, the content of which is incorporated herein by reference.

BACKGROUND ART

As new transportation means other than buses and railways, a track-based transportation. system that runs on a track by running wheels made of rubber tires or the like is known. This type of rack based transportation system generally referred to as a "new transportation system."

Specific examples of the new transportation system include an automated people. mover. (APM: fully automatic unmanned transportation vehicle) and automated guideway transit (AGT: automatic guide rail passenger transportation system) for urban areas.

Meanwhile, as the new transportation system, a passive system in which a vehicle is steered while guide wheels are guided by guide rails provided on a track and an active system in which the vehicle runs on the track by its own steering are known. In the active system, in a case where a power loss occurs, not only running but also steering cannot be performed. Therefore, it is necessary to take measures such as preventing derailment when the power is lost.

Here, Patent Document 1 discloses a device capable of generating a steering assist force by an auxiliary power mounted on a vehicle when a vehicle-mounted battery has failed.

CITATION LIST

Patent Document

[Patent Document 1] Japanese Unexamined Patent Application Publication No. 2009-90814

SUMMARY OF INVENTION

Technical Subject

However, the device described in Patent Document 1 is applied to a power steering device for performing the steering of an automobile. Hence, even if a power loss occurs due to the battery failure, it is possible for driver to continue steering the vehicle by operating the steering. That is, the device described in Patent Document 1 is nut a device applied to an automatic steering vehicle, and the device of Patent Document 1 only generates a steering assist force when the power is lost and does not perform all steering control.

Thus, the present invention provides a power supply device capable of more safely controlling the running of an automatic steering vehicle when the power is lost, an automatic steering vehicle including the power supply device, and a power supply method to the automatic steering vehicle.

Subject to be Solved

A power supply device of an aspect of the present invention is a power supply device provided in an automatic steering vehicle having a vehicle body, and a bogie including a running wheel allowing the vehicle body to run on a track and a steering device capable of automatically steering the running wheel, the power supply device including a primary power supply system that supplies power to a motor that rotationally drives the running wheel; a voltage converter unit that. converts a voltage by supplying a part of the power of the: primary power supply system; a secondary power supply system that supplies the power converted by the voltage converter unit to the steering device; and a primary backup power supply capable of supplying the power to the voltage converter unit when the voltage of the power detected by the primary power supply system is smaller than a predetermined value.

Additionally, the above power supply device may further include a secondary backup power supply that is provided in the secondary power supply system to supply the power to the steering device, and the secondary backup power supply may be capable of supplying the power to the steering device when the voltage of the power detected by the voltage converter unit is Smaller than a predetermined value.

Additionally, in the above power supply device, the secondary backup power supply may have a battery management system that manages a state of the secondary backup power supply.

Additionally, in the above Power supply device, the battery management system may operate a safety brake device provided on the bogie to apply a braking force to the running wheel when a voltage of the power capable of being supplied from the secondary backup power supply to the steering device is smaller than a predetermined value.

Additionally, in the above power supply device, the steering device may include an actuator that steers the running wheel and a sensor for determining an amount of operation of the actuator, the secondary power supply system may include a steering system that supplies the power to the actuator and a sensor system that supplies the power to the sensor, and the secondary backup power supply may be provided in each of the steering system and the sensor system.

Additionally, in the above power supply device, the power may be capable of being supplied in parallel from the voltage converter unit to the. steering system and the sensor system.

Additionally, in she above power supply device, the secondary backup power supply may be provided on the bogie.

Additionally, in the power supply device, the secondary backup power supply provided in the steering system may be provided so as to be capable of absorbing an external force applied to the actuator as regenerative power.

Additionally, in the power supply device, the steering system and the sensor system may be provided in a pair in correspondence with the bogie provided at a front portion of the vehicle body in a running direction and the bogie provided at a rear portion. of the vehicle body in the running direction, the secondary backup power supply provided in corn of the pair of steering systems may be capable of supplying the power to any of the pair of steering systems, and the secondary backup power supply provided in each of the pair of sensor systems: may be capable of supplying the power to any of the pair of sensor systems.

Additionally, in the above power supply device, the voltage converter unit may have a relay that operates a safety brake device that is provided on the bogie to apply a braking force to the running wheel when the: voltage of the power detected by the voltage converter unit is smaller than a predetermined value.

Additionally, in the above power supply device, the. primary power supply system. may have a relay that operates a safety brake device. that is provided on the bogie to apply a braking force to the running wheel when the voltage of the power detected by the primary power supply system is smaller than a predetermined value.

Additionally, an automatic steering vehicle of one aspect of the present invention includes the above power supply device; a bogie. having a running wheel capable of being rotationally driven by power from the power supply device and a steering device caPable of automatically steering the running wheel by the power; and a vehicle body provided with the bogie.

Additionally, a power supply method of one aspect of the present invention is a power supply method to an automatic steering vehicle having a vehicle body, and a bogie including a running wheel allowing the vehicle body to run on a track and a steering device capable of automatically steering the running wheel, the power supply method including a step of supplying power to a motor that rotationally drives the running wheel, by a primary power supply system; a step of converting a voltage with a voltage converter unit by supplying a part of the power of the primary power supply system; a step of supplying the power converted by the voltage converter unit to the steering device; and a step of supplying power to the voltage converter unit by a primary backup power supply when the voltage of the power detected by the primary power supply system is smaller than a predetermined value.

Additionally, the above power supply method may further include a step of supplying power from a secondary backup power supply to the steering device when the voltage of the power detected by the voltage converter unit is smaller than a predetermined value.

Additionally, the above power supply method may further include a step of applying a braking force to the running wheel when a voltage of the power capable of being supplied from the secondary backup power supply to the steering device is smaller than a predetermined value.

Advantageous Effects of Invention

According to the present invention, it is possible to, more safely control the running of the automatic steering vehicle when the power is lost.

BRIEF DESCRIPTION OF THE DRAWINGS

FIG. 3 is a diagram showing a power supply method in the power supply device and is a flow diagram in a primary power supply system.

FIG. 4 is a diagram showing the power supply method in the power supply device and is a flow diagram in a voltage converter unit.

DESCRIPTION OF EMBODIMENTS

A vehicle 1, which is an automatic steering vehicle according to an embodiment of the present invention, will he described with reference to the drawings.

Figure 1:
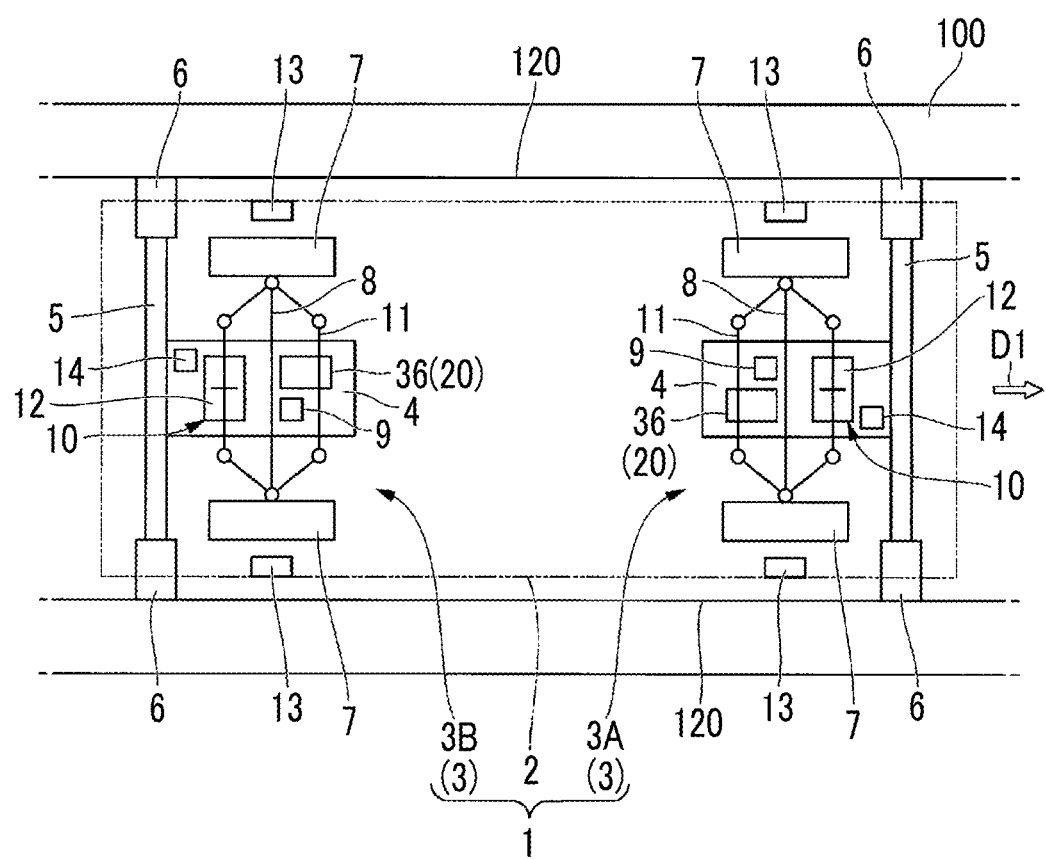
FIG. 1 is a schematic top view of a bogie in a vehicle according to an embodiment of the present invention.

As shown in FIG. 1, the vehicle 1 is a vehicle of a new transportation system and includes a vehicle body 2, a bogie 2 provided at the lower portion of the vehicle body 2, and a power supply device 20 that supplies power to the bogie 3.

The vehicle body 2 has a hollow shape of a substantially rectangular parallelepiped that is long in a front-rear direction in a running direction D1. A space capable of accommodating passengers is provided. inside the vehicle body 2.

The bogie 3 supports the vehicle body 2 from below and runs on a track 100. The bogies 3 are provided one by one at lower portions in a front portion and a rear portion of the vehicle body 2 in the running direction D1. A bogie 3A disposed at the front portion and a bogie 3P, disposed at a rear portion have the same configuration.

Each of the bogies 3 (3A, 3B) includes a bogie frame 4 attached to the vehicle body 2, running wheels 7 supported by the bogie frame 4, and a steering device 10 that automatically steers the running wheels 7.

The bogie frame 4 is provided with an axle 8 that extends in a width direction of the track 100 intersecting the running direction D1 of the vehicle 1. Additionally, the bogie frame 4 is provided with a motor 9 that rotates the axle 8. Additionally, in the present embodiment, the bogie frame 4 is provided with a power feed unit 5 that extends in the width direction of the track 100. Pantographs 6 are provided at both ends of the power feed unit 5. Each pantograph 6 is electrically connected to the power supply device 20. As the pantograph 6 comes into contact with a power feeding line 120 provided along a side wall of the track 100, power is supplied to the bogie 3 via the power supply device 20.

Here, a battery may be provided instead of the power feed unit 5 and the pantograph 6. In this case, since the bogie 3 is supplied with power from the battery, not from the power feeding line 120 of the track 100, it is not necessary to provide the track 100 with the power feeding line 120. Additionally, the power from the power feeding line 120 and the power from, the battery may be used together and supplied to the bogie 3.

The running wheels 7 are rubber tires that are provided one by one at both ends of the axle 8. The running wheels 7 are rotatable together with the axle 8.

The steering device 10 has a connecting arm 11 that connects the bogie frame 4 and the running wheels 7, an actuator 12 that operates the connecting arm 11, a sensor 13 that detects the position of each running wheel 7 on the track 100, and a sensor 13, and a steering control unit 14 that operates the actuator 12 on the basis of a detection result.

The connecting arm 11 connects the running wheels 7 on both sides of the axle 8 and links the running wheels 7 so that the running wheels 7 are turnable around an axis extending in an up-and-down direction to steer the running wheels 7.

The actuator 12 is, for example, an air cylinder, a hydraulic cylinder, an electric cylinder, or the like. The running wheels 7 are steered through the connecting arm by the operation of the actuator 12. The actuator 12 is provided on the bogie frame 4.

The sensor 13 is a device that detects the position of each running wheel 7 in the width direction by detecting the distance between the side wall (not shown) of the track 100 and the vehicle body 2 using, for example, a laser or the like. The sensor 13 may be provided on the vehicle body 2 or the bogie. 3. In the sensor 13 of the present embodiment, for example, one is provided at each of both ends of the vehicle body 2 in the width direction near the bogie 3A at the front portion in the running direction D1, and one is provided at each of both ends of the vehicle body 2 in the width direction near the bogie 3B at the rear portion in the running direction D1. However, the number and installation position of sensors 13 are not limited to the above-described cases. Additionally, the sensor 13 may be a device that receives a global positioning system (GPS) signal to detect the position, posture, and the like of the vehicle 1.

The steering control unit 14 has a processor or the like and acquires u detection signal of the sensor 13 to operate the actuator 12. That is when the sensor 13 detects that the position of each running wheel 7 deviates from a predetermined position in the width direction of the track 100, the steering control unit 14 steers the running wheel 7 such that the running wheel 7 returns to the predetermined position. The steering control unit 14 male be provided on the vehicle body 2 or the bogie 3.

Next, the power supply device 20 will be described in detail with reference to FIG. 2.

Figure 2:
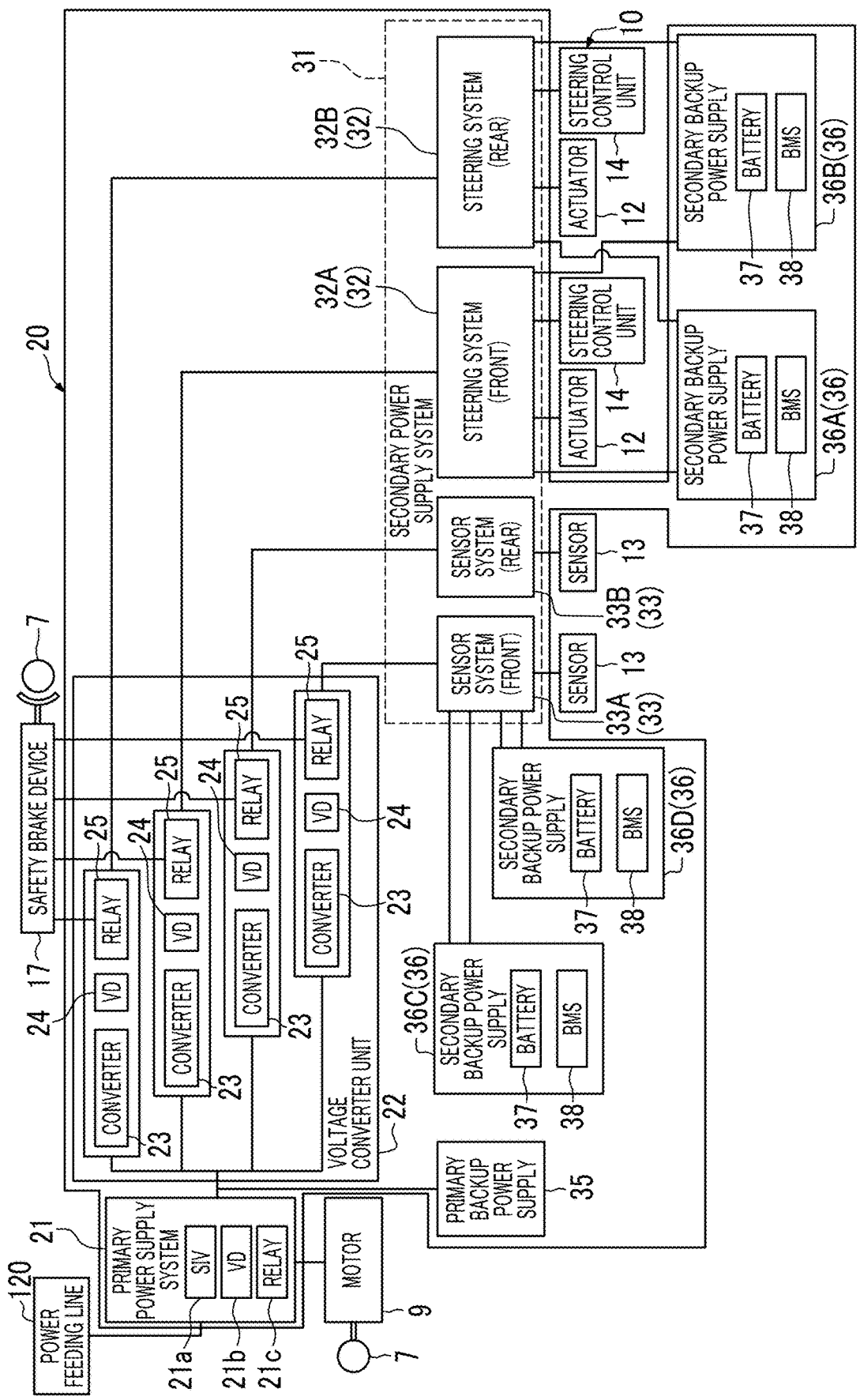
FIG. 2 is a block diagram showing a configuration of a power supply device. of a vehicle according to the embodiment of the present invention.

As shown in FIG. 2, the power supply device 20 includes a primary power supply system 21, a secondary power supply system 31, a voltage converter unit 22, a primary backup power supply 35, and a secondary backup power supply 36.

The primary power supply system 21 has wiring and electronic devices (not shown) for rotationally driving the running wheels 7. That is, the primary power supply system is power supply system of a drive system, and the running wheels 7 are rotationally driven by supplying the power taken from the power feeding line 120 by the pantograph 6 to the motor 9 of the bogie. The primary power supply system 21 is also connected to, for example, interior lighting, air conditioning, a door engine, and the like (not shown), and supplies power to these devices as well.

The primary power supply system 21 has a static inverter (SIV) 21a, a voltage detector (VD) 21b, and a relay 21c from the upstream side of the flow of electricity toward the downstream side thereof. For example, the SIV 21a converts the voltage of the power from the power feeding line 120 or performs AC/DC conversion of the power. The relay 21c operates a safety brake device 17 that applies a braking force to the running wheels 7 when the voltage of the power supplied from the upstream in the VD 21b is smaller than a predetermined value. Although detailed illustration is omitted, the safety brake device 17 applies a braking force to the running wheels 7 by operating a brake cylinder (not shown) of a regular brake in a system different from the regular brake in an emergency.

The voltage converter unit 22 is supplied with a part of the power of the primary power supply system 21 to convert the voltage. The voltage converter unit 22 has a DC/DC converter 23, a voltage detector (VD) 24, and a relay 25 from the upstream side of the flow of electricity to the downstream side thereof.

The relay 25 is operated when the voltage of the power supplied from the upstream of the voltage converter unit 22 in the VD 24 is smaller than a predetermined value and operates the above safety brake device 17 that applies a braking force to the running wheels 7.

In the present embodiment, a plurality of sets (4 sets) of the DC/DC converter 23, the VD 24, and the relay 25 are provided.

The secondary power supply system 31 is electrically connected to the voltage converter unit 22. The power after voltage conversion is supply supplied to the secondary power supply system 31 by the voltage converter unit 22. The secondary power supply system 31 has wiring and electronic devices (not shown) for operating device other than the running wheels 7. That is, the secondary power supply system 31 has a steering system 32 that supplies power to the actuator 12 and the steering control unit 14, and a sensor system 33 that supplies power to the sensor 13.

The power from the primary power supply system 21 is converted and supplied to the steering system 32 by the voltage converter unit 22. The voltage of the power supplied from the primary power supply system 21 to the voltage converter unit 22 is, for example, DC 100 V, and the voltage of the steering system 32 is, for example, DC 12 V.

In the present embodiment, two systems of a steering system (front) 322 that operates the actuator 12 of the bogie 3A at the front portion in the running direction D1 and a steering system (rear) 32B that operates the actuator of the bogie 3B at the rear portion in the running direction D1 are provided. Each steering system 32 is connected to one set of the DC/DC converter 23, the VD 24, and the relay 25 in the voltage converter unit 22. That is, power can be supplied in parallel from the voltage converter unit 22 to the respective steering systems 32.

The power from the primary power supply system 21 is converted and supplied to the sensor system 33 by the voltage converter unit 22. The voltage of the sensor system 33 is, for example, DC 24 V different from that of the steering system 32.

In the present embodiment, two systems of a sensor system (front) 33A that operates the sensor 13 close to the bogie 3A at the front portion in the running direction D1 and a sensor system (rear) 33B that operates the sensor 13 close to the bogie 3B at the rear portion in the running direction D1 are provided. Each sensor system 33 is connected to one set of the DC/DC converter 23, the VD 24, and the relay 25 in the voltage converter unit 22. That is, power can be supplied in parallel from the voltage converter unit 22 to the respective sensor systems 33.

The primary backup power supply 35 is a battery and is provided on the vehicle body 2 or the bogie 3. The primary backup power supply 35 is provided by being electrically connected between the primary power supply system 21 and the voltage converter unit 22. As will be described below in detail the primary backup power supply 35 supplies the power to the voltage converter unit 22, which is required until the vehicle 1 makes an emergency stop while being safely and automatically steered when the voltage of she power detected by the VD 21b of the primary power supply system 21 is smaller than a predetermined value. The primary backup power supply 35 may supply power only to the secondary power supply system 31 via the voltage converter unit 22, or may supply power to. the primary power supply system 21 in addition to the secondary power supply system 31.

The voltage of the power that the primary backup power supply 35 can supply to the voltage converter unit 22 is a voltage sufficient for operating the devices on the downstream side of the primary backup power supply 35 and is slightly lower than the voltage of the power supplied to the voltage converter unit 22 by the primary power supply system 21 during normal operation. Accordingly, for example, the voltage of the power supplied to the voltage converter unit 22 by the primary power supply system 21 decreases. When this voltage becomes lower than the voltage of the power that the primary backup power supply 35 can supply to the voltage converter unit 22, the power supply from the primary backup power supply 35 to the voltage converter unit is automatically started. The primary backup power supply 35 may be provided so as to be capable of floating charging.

The secondary backup power supply 36 is electrically connected to each of the sensor system 33 and the steering system 32 in the secondary power supply system 31 and is capable of supplying power to each system with the same voltage as each system. The secondary backup power supply 36 supplies the secondary power supply system 31 with the power required until the vehicle 1 makes an emergency stop while being safely and automatically steered. Each secondary backup power supply 36 has a battery 37 and a battery management system (BMS) 38. The BMS 38 manages the state of the secondary backup power supply 36 and allows a braking force to be applied to the running wheels 7 by operating the safety brake device 17 when the voltage of the power capable of being supplied to the sensor 13, the actuator 12, and the steering control unit 14 is smaller than a predetermined value.

Additionally, the secondary backup power supply 36 absorbs the regenerative power when an external force acts on the actuator 12. The secondary backup power supply 36 may be provided so as to be capable of floating charging. In this case, when the BMS 38 determines that the state of the secondary backup power supply 36 is abnormal, the charging and discharging of the secondary backup power supply 36 may be stopped in addition to operating the safety brake device 17.

The voltage of the power that the secondary backup power supply 36 can supply to the sensor system 33 and the steering system 32 of the secondary power supply system 31 is a voltage snfficient for operating the devices on the downstream side of the secondary backup power supply 36 and is slightly lower than the voltage of the power supplied to the sensor system 33 and the steering system 32 by the voltage converter unit 22 during normal operation. Accordingly, for example, the voltage of the power supplied to the sensor system 33 and the steering system 32 by the voltage converter unit 22 decreases. When this voltage is lower than the voltage of the power that the secondary backup power supply 36 can supply to the sensor system 33 and the steering system 32, the power supply from the secondary backup power supply 36 to the sensor system 33 and the steering system 32 is automatically started.

For example, in the present embodiment, all the secondary backup power supplies 36 are provided on the bogie frame 4. However, at least the secondary backup power supply 36 provided in the steering system 32 may be provided on the bogie frame 4. That is, at least the secondary backup power supply 36 that operates the actuator 12 may be provided on the bogie frame 4 at a position close to the actuator 12. Additionally, the secondary backup power supply 36 may be provided in a portion of the bogie 3 other than the bogie frame 4.

Additionally, it is also possible to supply power to both the two steering systems 32 from each of the secondary backup power supplies 36 connected to the two steering systems 32. Similarly, it is possible to supply power to both the two sensor systems 33 from each of the secondary backup power supplies 36 connected to the two sensor systems 33.

Next, the flow of the power supply method in the power supply device 20 will be described with reference to FIGS. 3 to 5.

First, the flow of the primary power supply system 21 will be described. As shown in FIG. 3, power is supplied from the upstream of the primary power supply system 21, that is, from the power feeding line 120 via the pantograph 6 to the primary power supply system 21. In this case, in a case where the voltage detected by the VD 21$b$ is equal to or higher than the threshold value (predetermined value), a "YES" determination is made and the flow returns to the start. On the other hand, in a case where the voltage detected by the VD 21$b$ is smaller than the threshold value (predetermined value), a "NO" determination is made (Step S1). Then, in a case where a "NO" determination is made in Step S1, the relay 21$c$ is operated by the VD 21$b$, the safety brake device 17 is operated by the relay 21$c$, and power supply is automatically started from the primary backup power supply 35 to the voltage converter unit 22 in parallel with the operation of the safety brake device 17 (Step S2).

In addition, the safety brake device 17 and the primary backup power supply 35 are operated not only in a case where a problem occurs in a device on the upstream side off the primary power supply system 21 such as the pantograph 6 but also in a case where a disconnection or the like occurs on: the upstream side of the VD 21$b$ in the primary power supply system 21.

Next, the flow of the voltage converter unit 22 will be described. As shown in FIG. 4, power is supplied from the upstream of the voltage converter unit 22, that is, from the primary power supply system 21 or the primary backup power supply 35 to the voltage converter unit 22. In this case, in a case where the voltage detected by the VD 24 is equal to or higher than the threshold value (predetermined value) , a "YES" determination is made and the flow returns to the start. On the other hand, in a case where the voltage detected. by the VD 24 is smaller than the threshold value (predetermined value), a "NO" determination is made (Step S11).

Then, in a case where a "NO" determination is made in Sep S11, the relay 25 is operated by the VD 24, the safety brake device 17 is operated by the relay 25, and power supply is automatically started from the secondary backup power supply 36 to the voatage converter unit 22 in parallel with the operation of the safety brake device 17 (Step S12).

The flow of the primary power supply system 21 shown in FIG. 3 and the flow of the voltage converter unit 22 shown in FIG. 4 operate independently. For this reason, even in a case where the primary power supply system 21 and the primary backup power supply 35 have no problem and are normally operating, the safety brake device 17 and the secondary backup power supply 36 are operated in a case where the voltage detected by the VD 24 is smaller than a threshold value due to a disconnection in the voltage converter unit 22 or the like.

Next, the flow of the secondary backup power supply 36 will be described. As shown in FIG. 5, is the secondary backup power supply 36, in a case where the EMS 38 detects that the voltage of the power capable of being supplied from the secondary backup power supply 36 to the secondary power supply system 31 is equal to or higher than a threshold value (predetermined value), a "YES" determination is made and the flow returns to the start. On the other hand, in a case where the BMS 38 detects that the voltage of the power capable of being supplied from the secondary backup power supply 36 to the secondary power supply system 31 is smaller than the threshold value, a "NO" determination is Made (Step S21). Then, in a case where a "NO" determination is made in Step S21, the safety brake device 17 is operated by the BMS 38 (Step S22).

Figure 5:
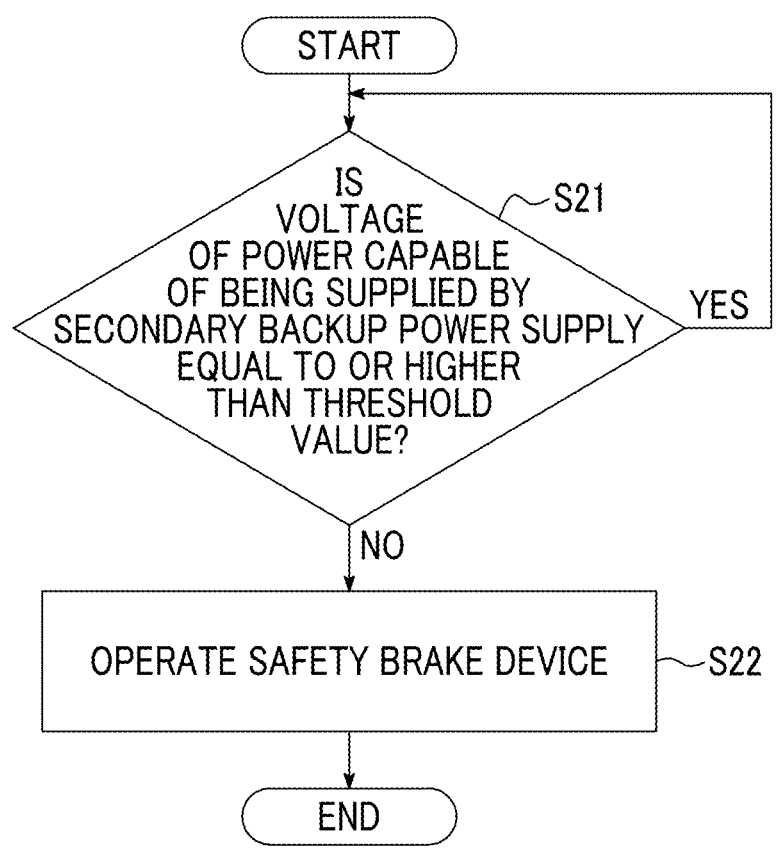
FIG. 5 is a diagram showing the power supply method in the power supply device and is a flow diagram in a secondary backup power supply.

The flow of the secondary backup power supply 36 shown in FIG. 5, the flow of the primary power supply system 21 shown in FIG. 3, and the flow of the voltage converter unit 22 shown in FIG. 4 operate independently. For this reason, even in a case where the primary power supply system 21, the primary backup power supply 35, and the voltage converter unit 22 have no problem and are normally operating, the safety brake device 17 is operated in a case where a problem occurs in the secondary backup power supply 36 itself.

According to the vehicle 1 of the present embodiment described above, in a case where a problem occurs in the primary power supply system 21 for some reason, the voltage of the power detected by the VD 21b smaller than the above threshold value. In this case, sufficient power is not supplied to the secondary power supply system 31 on the downstream side of the VD 21b, and sufficient power cannot be supplied to the steering device IC), However, in this case, since power is. automatically supplied from the primary backup power supply 35 to the voltage converter unit 22, the automatic steering of the running wheels 7 can be continued without insufficient. supply and stop of power to the steering device 10. Hence, it is possible to avoid derailment or the like of the vehicle 1 when the power is lost. That is, the running of the vehicle 1 can be safely controlled.

Additionally, since the power supply device 20 is provided with the secondary backup power supply 36, even when the primary backup power supply 35 cannot supply sufficient power to the voltage converter unit 22, the automatic steering of the running wheels 7 can be continued without insufficient supply or stop of power to the steering device 10. Thus, the redundancy of the automatic steering control can be improved, and the possibility of derailment or the like of the vehicle 1 can be further reduced.

Additionally, power can be supplied in parallel from the voltage converter unit 22 to each of the steering system 32 and the senor system 33, and each of the steering system 32 and the sensor system 33 is provided with one secondary backup power supply 36. Therefore, the voltage of the steering system 32 and the voltage of the sensor system 33 can be set to different voltages.

Moreover, in the present embodiment, each of the steering system 32 and the sensor system 33 in each of the front and rear bogies 3A and 3B is provided with one secondary backup power supply 36. For this reason, power can be directly supplied to the actuator 12, the sensor 13, and the steering control unit 14 with the voltage of the secondary power supply system 31 without passing through the voltage converter unit 22. Thus, by controlling the steering device 10 instantly when the power is lost, the running of the vehicle 1 can be more reliably controlled.

Additionally, each of the secondary backup power supplies 36 in both the steering systems 32 of the front and rear bogies 3A and 3B can supply power to both the steering systems 32 of the front and rear bogies 3A and 3B. Similarly, each of the secondary backup power supplies 36 in both the sensor systems 33 of the front and rear bogies 3A and 3B can supply power to both the sensor systems 33 of the front and rear bogies 3A and 3B.

Hence, even if one of the secondary backup power supplies 36 of the steering systems 32 fails, the other can supply power to both the steering systems 32 of the front and rear bogies 3A and 3B, and even if one of the secondary backup power supplies 36 of the sensor system 33 fails, the other can supply power to both the sensor systems 33 of the front and rear bogies 3A and 3B. Hence, the redundancy can. be improved.

Moreover, the secondary backup power supply 36 is provided with a BMS 38. The BMS 38 can manage the state of the secondary backup power supply 36 itself and can always keep the secondary backup power supply 36 in an optimal state. For example, even if the primary power supply system and the primary backup power supply 35 are normally operating, the voltage of the power capable of being supplied from the secondary backup power supply 36 to the steering device 10 due to a failure of the secondary backup power supply 36 is smaller than a predetermined value, there is a possibility that the steering device 10 is not sufficiently operated by the secondary backup power supply 36. In this case, by operating the safety brake device 17 by the BPS 38, it possible to avoid that the vehicle 1 continues running in a state where the secondary backup power supply 36 cannot operate.

Moreover, in the present embodiment, in a case where a problem occurs in the voltage converter unit 22, the voltage detected by the VD 24 is smaller than a predetermined value. In this case, power can be automatically supplied from. the secondary backup power supply 36 to the steering device 10. Hence, even in a case where the supply amount of power decreases without stopping the power supply from the primary power supply system 21 to the voltage converter unit 22 and/or the power supply from the primary backup power supply 35 to the voltage converter unit 22, power can be subsidiarily supplied from the secondary backup power supply 36 to the steering device 10, and automatic steering of the running wheels 7 can be reliably performed.

Additionally, since the secondary backup power supply 36 of the steering system 32 is provided on the bogie frame 4, the secondary backup power supply 36 can be disposed near the actuator 12. Therefore, when power is supplied from the secondary backup power supply 36 to the actuator 12, the transmission loss of the power can be reduced. Accordingly, the actuator 12 can be more reliably operated, the capacity of the secondary backup power supply 36 can be reduced, and the size of the entire power supply device 20 can be reduced.

Moreover, the secondary backup power supply 16 absorbs the regenerative power when an external force acts on the actuator 12. Hence, for example, in a case where the running wheels are suddenly steered by an external force, the problem that the power generated by the actuator 12 exceeds a withstand voltage in a circuit of the steering system 32 and the circuit is damaged can be avoided.

Additionally, when the voltage of the power detected by the VD 24 of the voltage converter unit 22 is smaller than the threshold value, the safety brake device 17 can be operated. Hence, the automatic steering of the running wheels 7 can be continued by the secondary backup power supply 36 while the vehicle 1 is stopped. Therefore, it is possible to safely stop the vehicle 1.

Although the embodiment of the present invention has been described in detail above with reference to the drawing, the components and combinations thereof in the embodiment are examples, and additions, omissions, replacements, and other modifications of components can be made within departing from the concept of the present invention. Additionally, the present invention is not limited by the embodiment but limited only by the claims.

The secondary backup power supply 36 may be provided not only in. the secondary power supply system 31 but also. in the primary power supply system 21.

The secondary power supply system 31 may further have a system other than the steering system. 32 and the sensor System 33.

The actuator 12 of each of the front and rear bogies 3A and 3B is provides with one steering control unit 14. However, in a case where one steering control unit 14 fails, the actuators 12 of the front and rear bogies 3A and 3B may be operated by any one steering control unit 14.

Additionally, the vehicle 1 may have the same configuration as a vehicle of a new passive transportation system in which guide wheels guided by guide rails on both side portions of the track 100 are provided on the bogie frame 4. In this case, even if power loss makes automatic steering, the running of the vehicle 1 can be more safely controlled.

A plurality of the vehicles 1 may be connected to each other, and the number of bogies 3 provided in the vehicle 1 is not limited to the above-described case.

In the above, the power supply from the primary backup power supply 35 and the secondary backup power supply 36 is automatically started. However, a control device may be separately provided to start the power supply from the primary backup power supply 35 and the secondary backup power supply 35.

The embodiment of the present invention has been described in detail above with reference to the drawings. However, the specific configuration is not limited to the embodiment and includes design changes. or the like without departing from the spirit of the present invention.

INDUSTRIAL APPLICABILITY

The present invention is applicable to power supply devices, automatic steering vehicles, and power supply methods.

REFERENCE SIGNS LIST 1 vehicle
2 vehicle body
3, 3A, 3B bogie
4 bogie frame
5 power feed unit
6 pantograph
7 running wheel
8 axle
9 motor
10 steering device
11 connecting arm
12 actuator
13 sensor
14 steering control unit
17 safety brake device
20 power supply device
21 primary power supply system
21a SIV
21b, 24 VD
21c relay
22 voltage converter unit
23 DC/DC converter
25 relay
31 secondary power supply system
32 steering system
33 sensor system
35 primary backup power supply
36 secondary backup power supply
37 battery
38 BMS
100 track
120 power feeding line
D1 running direction

The invention claimed is:

1. A power supply device provided in an automatic steering vehicle having a vehicle body, and a bogie including a running wheel allowing the vehicle body to run on a track and a steering device capable of automatically steering the running wheel, the power supply device comprising:
   a primary power supply system that supplies power to a motor that rotationally drives the running wheel;
   a voltage converter unit that converts a voltage by supplying a part of the power of the primary power supply system;
   a secondary power supply system that supplies the power converted by the voltage converter unit to the steering device;
   a primary backup power supply capable of supplying the power to the voltage converter unit when the voltage of the power detected by the primary power supply system is smaller than a predetermined value; and
   a secondary backup power supply that is provided in the secondary power supply system to supply the power to the steering device,
   wherein the secondary backup power supply is capable of supplying the power to the steering device when the voltage of the power detected by the voltage converter unit is smaller than a predetermined value,
   wherein the steering device includes an actuator that steers the running wheel and a sensor for determining an amount of operation of the actuator,
   the secondary power supply system includes a steering system that supplies the power to the actuator and a sensor system that supplies the power to the sensor, and
   the secondary backup power supply is provided in each of the steering system and the sensor system.

2. The power supply device according to claim 1,
wherein the secondary backup power supply has a battery management system that manages a state of the secondary backup power supply.

3. The power supply device according to claim 2,
wherein the battery management system operates a safety brake device provided on the bogie to apply a braking force to the running wheel when a voltage of the power capable of being supplied from the secondary backup power supply to the steering device is smaller than a predetermined value.

4. The power supply device according to claim 1,
wherein the power is capable of being supplied in parallel from the voltage converter unit to the steering system and the sensor system.

5. The power supply device according to claim 1,
wherein the secondary backup power supply is provided on the bogie.

6. The power supply device according to claim 1,
wherein the secondary backup power supply provided in the steering system is provided so as to be capable of absorbing an external force applied to the actuator as regenerative power.

7. The power supply device according to claim 1,
wherein the steering system and the sensor system are provided in a pair in correspondence with the bogie provided at a front portion of the vehicle body in a running direction and the bogie provided at a rear portion of the vehicle body in the running direction,
the secondary backup power supply provided in each of the pair of steering systems is capable of supplying the power to any of the pair of steering systems, and
the secondary backup power supply provided in each of the pair of sensor systems is capable of supplying the power to any of the pair of sensor systems.

8. The power supply device according to claim 1, wherein the voltage converter unit has a relay that operates a safety brake device that is provided on the bogie to apply a braking force to the running wheel when the voltage of the power detected by the voltage converter unit is smaller than a predetermined value.

9. The power supply device according to claim 1, wherein the primary power supply system has a relay that operates a safety brake device that is provided on the bogie to apply a braking force to the running wheel when the voltage of the power detected by the primary power supply system is smaller than a predetermined value.

10. An automatic steering vehicle comprising:
the power supply device according to claim 1;
a bogie having a running wheel capable of being rotationally driven by power from the power supply device and a steering device capable of automatically steering the running wheel by the power; and
a vehicle body provided with the bogie.

11. A power supply method to an automatic steering vehicle having a vehicle body, and a bogie including a running wheel allowing the vehicle body to run on a track and a steering device capable of automatically steering the running wheel, the power supply method comprising:

a step of supplying power to a motor that rotationally drives the running wheel, by a primary power supply system;
a step of converting a voltage with a voltage converter unit by supplying a part of the power of the primary power supply system;
a step of supplying the power converted by the voltage converter unit to the steering device;
a step of supplying power to the voltage converter unit by a primary backup power supply when the voltage of the power detected by the primary power supply system is smaller than a predetermined value; and
a step of supplying the power to the steering device, using a secondary backup power supply that is provided in the secondary power supply system to supply the power to the steering device, when the voltage of the power detected by the voltage converter unit is smaller than a predetermined value,
wherein the steering device includes an actuator that steers the running wheel and a sensor for determining an amount of operation of the actuator,
the secondary power supply system includes a steering system that supplies the power to the actuator and a sensor system that supplies the power to the sensor, and
the secondary backup power supply is provided in each of the steering system and the sensor system.

12. The power supply method according to claim 11, further comprising:
a step of supplying power from a secondary backup power supply to the steering device when the voltage of the power detected by the voltage converter unit is smaller than a predetermined value.

13. The power supply method according to claim 12, further comprising:
a step of applying a braking force to the running wheel when a voltage of the power capable of being supplied from the secondary backup power supply to the steering device is smaller than a predetermined value.

\* \* \* \* \*